US006719197B2

(12) United States Patent
Yajima

(10) Patent No.: US 6,719,197 B2
(45) Date of Patent: Apr. 13, 2004

(54) SYSTEM, APPARATUS, AND METHOD FOR ISSUING RECEIPTS AND PROVIDING ADVERTISING

(75) Inventor: Torao Yajima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 129 days.

(21) Appl. No.: 09/997,234

(22) Filed: Nov. 30, 2001

(65) Prior Publication Data

US 2002/0113120 A1 Aug. 22, 2002

(30) Foreign Application Priority Data

Dec. 1, 2000 (JP) .................................... P.2000-366968

(51) Int. Cl.$^{7}$ ................................................ G06F 17/00
(52) U.S. Cl. ....................................... 235/375; 358/1.12
(58) Field of Search ................................ 235/375, 381, 235/383, 385, 436, 441; 358/1.12, 1.15; 709/219; 434/317, 365

(56) References Cited

U.S. PATENT DOCUMENTS

| | | | | |
|---|---|---|---|---|
| 5,616,929 | A | 4/1997 | Hara | |
| 5,975,665 | A | 11/1999 | Torigoe et al. | |
| 5,975,688 | A | 11/1999 | Kanaya et al. | |
| 5,997,121 | A | 12/1999 | Altfather et al. | |
| 6,000,773 | A | 12/1999 | Murray et al. | |
| 6,012,795 | A | 1/2000 | Saito et al. | |
| 6,039,430 | A | 3/2000 | Helterline et al. | |
| 2001/0017707 | A1 * | 8/2001 | Lee | 358/1.12 |
| 2001/0035887 | A1 | 11/2001 | Altfather et al. | |
| 2001/0043364 | A1 * | 11/2001 | Messner et al. | 358/1.15 |
| 2002/0078171 | A1 * | 6/2002 | Schneider | 709/218 |
| 2002/0113120 | A1 * | 8/2002 | Yajima | 235/375 |
| 2003/0078863 | A1 * | 4/2003 | Pilu | 705/34 |
| 2003/0142339 | A1 * | 7/2003 | Pilu | 358/1.14 |

FOREIGN PATENT DOCUMENTS

| | | |
|---|---|---|
| DE | 100 42 914 | 4/2001 |
| EP | 0 573 274 | 12/1993 |

(List continued on next page.)

*Primary Examiner*—Thien M. Le
(74) *Attorney, Agent, or Firm*—Nixon & Vanderhye P.C.

(57) ABSTRACT

A Point-of-Sale (POS) terminal 3 of a POS system 1 may be equipped with an ink-jet printer. An ink cartridge 15 serving as an ink supply source is loaded onto a cartridge loading section 16. The ink cartridge 15 may be equipped with an IC memory chip 27 having ad information retained therein. When the ink cartridge 15 is loaded onto the cartridge loading section 16, ad information 6 may be read by the POS terminal 3. The ad information 6 may be printed on a receipt 17 to be issued or displayed to a display device 19. So long as an ink cartridge provider receives charges for advertisement from a commercial sponsor, the provider is able to sell large numbers of ink cartridges inexpensively. Further, the user of the POS system can purchase ink cartridges, which are consumable items, at low cost.

29 Claims, 10 Drawing Sheets

FOREIGN PATENT DOCUMENTS

| | | |
|---|---|---|
| EP | 0 604 146 | 6/1994 |
| EP | 0 626 267 | 11/1994 |
| EP | 0 706 888 | 4/1996 |
| EP | 0 779 156 | 6/1997 |
| EP | 0 844 094 | 5/1998 |
| EP | 0 860 284 | 8/1998 |
| EP | 0 873 873 | 10/1998 |
| EP | 0 881 080 | 12/1998 |
| EP | 0 955 169 | 11/1999 |
| JP | 5-332812 | 12/1993 |
| JP | 6-115089 | 4/1994 |
| JP | 7-164626 | 6/1995 |
| JP | 7-218321 | 8/1995 |
| JP | 7-311072 | 11/1995 |
| JP | 8-16928 | 1/1996 |
| JP | 8-43174 | 2/1996 |
| JP | 8-112907 | 5/1996 |
| JP | 8-161646 | 6/1996 |
| JP | 9-174877 | 7/1997 |
| JP | 10-24604 | 1/1998 |
| JP | 10-69360 | 3/1998 |
| JP | 10-91868 | 4/1998 |
| JP | 10-198864 | 7/1998 |
| JP | 10-202913 | 8/1998 |
| JP | 10-230616 | 9/1998 |
| JP | 10-323993 | 12/1998 |
| JP | 11-52900 | 2/1999 |
| JP | 2000-43282 | 2/2000 |
| JP | 2000-71471 | 3/2000 |
| JP | 2000-246921 | 9/2000 |

* cited by examiner

SYSTEM, APPARATUS, AND METHOD FOR ISSUING RECEIPTS AND PROVIDING ADVERTISING

BACKGROUND OF THE INVENTION

1. Field of the Invention

The present invention relates to a system, apparatus, and method for issuing receipts and providing advertising. The present invention may be utilized, for example, by a POS (point-of-sale) system or store register for issuing receipts, a receipt number issuing machine installed in a bank, a securities company, or a hospital, or a ticket issuing machine for issuing tickets (these machines and systems are hereinafter generically called an "apparatus for issuing receipts and the like").

2. Description of the Related Art

As a POS terminal installed in a convenience store, there has already been known a terminal which prints, in the margin of a receipt to be issued, information other than originally-required sales information, such as advertisements for products or a variety of event information items (these advertisements will hereinafter be generically called "ad information") Such a system is described in, for example, Japanese Patent Application Laid-Open No. 16928/1996. Moreover, a system which displays ad information on a display of a Pos terminal as telop data is described in, for example, Japanese Patent Application Laid-Open No. 69360/1998.

An apparatus for printing receipts and the like (hereinafter simply called an "apparatus") usually uses a rolled paper into which tape-like recording paper is coiled. Sales accounts for a purchase are printed on recording paper unreeled from the rolled paper. The resultant printout is separated by means of an automatic cutter, whereby a receipt slip is issued. When the rolled paper has become depleted, a new rolled paper is loaded into a roll paper loading section of the apparatus, and the thus-loaded roll is then used. As an apparatus for printing receipts and the like equipped with an ink-jet head, there has already been known an apparatus which uses an ink cartridge as an ink supply source. Even in this case, when ink of the ink cartridge has become depleted, a new ink cartridge is loaded into an ink cartridge loading section of the apparatus, and the thus-loaded ink cartridge is then used.

In the conventional art however, a store, for example, which uses an apparatus for printing receipts and the like usually bears the expense for the consumable items, such as rolls of recording paper and ink cartridges. Accordingly, a reduction in expenses for consumable items would be very beneficial to the store.

SUMMARY OF INVENTION

The present invention has been conceived in light of the aforementioned problems and aims at providing a system, apparatus, and method of issuing receipts and advertising which enable a reduction in expenses for consumable items borne by a user of the apparatus, by means of causing a commercial sponsor to utilize an ad printing function of the apparatus and of appropriating charges for advertisements to a portion of the expenses.

In order to solve the problems of the related art, the present invention provides a system for issuing receipts and advertising including an apparatus for printing receipts and the like, the apparatus including:

- a consumable item, including an ad information retaining section for retaining ad information;
- a consumable item loading section for loading the consumable item to the printing apparatus;
- an ad information reading section for reading the ad information retained in the ad information retaining section; and
- an ad information output section for outputting the read ad information.

Here, an ink cartridge or a rolled paper can usually be treated as the consumable item.

When a consumable item is loaded onto the system issuing receipts and the like having the above configuration, an advertisement retained in the consumable item can be printed on a receipt to be issued or displayed on a screen. Since a consumable item is combined with ad information in the manner as mentioned above, a portion of the purchase price of the consumable item can be transferred to a commercial sponsor as charges for advertisement.

According to the present invention, the ad information retaining section may retain information about the period of advertisement as well as ad information.

Here, information about the period of advertisement can be realized as the amount of consumable item consumed. In this case, the apparatus for printing receipts and the like can be equipped with an amount-of-consumption measurement section for measuring the consumption amount of a consumable item loaded onto the consumable item loading section. The advertisement output device can stop outputting an advertisement when the consumption amount of a consumable item has reached the predetermined consumption amount read by the ad information reading section.

Alternatively, information about the period of advertisement can be realized as a period of time during which a consumable item has been used. In this case, the apparatus for printing receipts and the like can have a time-of-use measurement section for measuring a period of time during which a consumable item loaded onto the consumable item loading section has been used. The advertisement output section can stop outputting an advertisement when the period of time during which a consumable item has been consumed has reached a period of predetermined consumption time read by the ad information reading section.

The ad information retaining section may be embodied as a memory chip, and the ad reading section may be embodied as a memory reader for reading the ad information from the memory chip. In this case, use of a memory chip enables retention of a large amount of advertisement or image information, thereby enabling highly effective advertisement.

Further, the ad information reading section may have a read terminal for connecting a terminal of the memory chip when the consumable item is loaded onto the consumable item loading section. As a result, effectiveness of reading information from a memory chip can be improved.

Also, the memory chip may have an ad history information storage area for storing ad history information about an amount of advertisement output by the ad information output section. The apparatus may additionally have a write section for writing into the consumption history information storage area the ad history information. By means of such a configuration, a commercial sponsor can reclaim used consumable items and ascertain how advertisement has been performed on the basis of the advertisement history information stored in the memory chip.

When the used consumable item is disposed, leaving the information stored in the memory chip intact is improper.

The apparatus for printing receipts and the like may include an end sensor for detecting depletion of a consumable item loaded onto the consumable item loading section, and an ad information erasure section which erases information stored in the memory chip when the end sensor has detected depletion of a consumable item.

According to the present invention, the ad information retaining section may also be embodied as a linear bar code symbol or a two-dimensional symbol rather than as a memory chip.

In this case, the ad information reading section is constructed so as to have a symbol reader for reading the symbol. The symbol may be read before a consumable item is loaded onto the system.

According to the present invention, in one embodiment, the ad information output section may be a print section for printing ad information on receipts and the like issued from the apparatus.

In operation, when the consumable item corresponds to a rolled paper, desirably the print section prints the ad information in a leading area of the next receipt in recording paper unreeled from the rolled paper, without breaking continuity from a print operation for issuing a receipt slip.

By means of this configuration, after issuance of a receipt slip, ad information is printed on the next receipt to be issued consecutively. In this case, the next receipt awaits printing of account information on the receipt. Hence, there is obviated the time required for printing ad information at the time of issuance of a receipt. As a result, there can be prevented occurrence of an increase in the time for issuing a receipt by the amount required for printing advertisement information.

According to the present invention, the ad information output section may also be embodied as a display device for displaying the ad information on a screen as image information. Alternatively, the ad information output section may be embodied as a sound output section for outputting the ad information as sound. Of course, the ad information output section may have a combination or all of the output devices including a print section, a display device, and a sound output section.

The ad information reading section may have an ad information storage section for storing read ad information, and the ad output section may be used to output ad information stored in the ad information storage section.

In this case, the apparatus for printing receipts and advertising may be equipped with an end sensor for detecting depletion of a consumable item loaded onto the consumable item loading section. Information may then be erased from the ad information storage section when the end sensor has detected depletion of a consumable item.

The present invention also provides a receipt issuing apparatus for use in the system for issuing receipts and the like set forth. The apparatus is characterized by ad information output means retained on a consumable item loaded to the apparatus.

In addition, the present invention also provides a method of issuing receipts and advertising comprising the steps of:

- storing information, such as advertising information, in a consumable and placing the consumable in a consumable item loading section of an information apparatus;
- reading the information from the consumable; and
- outputting the read information from an information output section.

Moreover, the present invention provides a method of issuing receipts and advertising, comprising the steps of:

- retaining information, such as advertising information, in an ink cartridge;
- reading the information from the ink cartridge using an apparatus which issues receipts and the like and uses the ink cartridge as an ink supply source to record the information; and
- recording the read ad information on a receipt and the like issued from the apparatus.

An advertisement may also be displayed on a screen, by means of displaying the read ad information on a display screen of the apparatus.

The present invention also provides a method of issuing receipts and the like, comprising the steps of:

- retaining information, such as advertising information, on a rolled paper;
- reading the information from the rolled paper using an apparatus which issues receipts and the like and uses the rolled paper as a recording medium supply source to record the information; and
- printing the read information on recording paper unreeled from the rolled paper, thereby recording the information on a receipt to be issued.

Even in this case, the read ad information may be displayed on a screen, by means of displaying the read ad information on a display screen of the apparatus.

The present invention also provides a consumable item having ad information retained therein to be used for the system for issuing receipts and advertising set forth. The consumable item is characterized by an information retaining section which may retain ad information.

In the case of a rolled paper to be used in a printer, the rolled paper may be provided with an ad information retaining section which retains corded ad information. In this case, it is desirable that the coded ad information is readable by a reader for decoding the coded ad information, and the ad information retaining section as a two-dimensional symbol capable of retaining a large amount of information is desirable.

In an ink cartridge storing ink to be used for an ink-jet printer, the cartridge may be provided with an ad information retaining section which retains coded ad information. Even in this case, it is desirable that the coded ad information is readable by a reader for decoding the coded ad information, and the ad information retaining section as a two-dimensional symbol or a memory chip, which is capable of retaining a large amount of information, is often desirable.

BRIEF DESCRIPTION OF DRAWINGS

FIG. 2(*b*) is a rear perspective view showing the POS terminal;

DETAILED DESCRIPTION OF PREFERRED EMBODIMENTS

Embodiments of a system, apparatus, and method for issuing receipts and advertsising, to which the present invention has been applied, will be described hereinbelow by reference to drawings.

Figure 1:
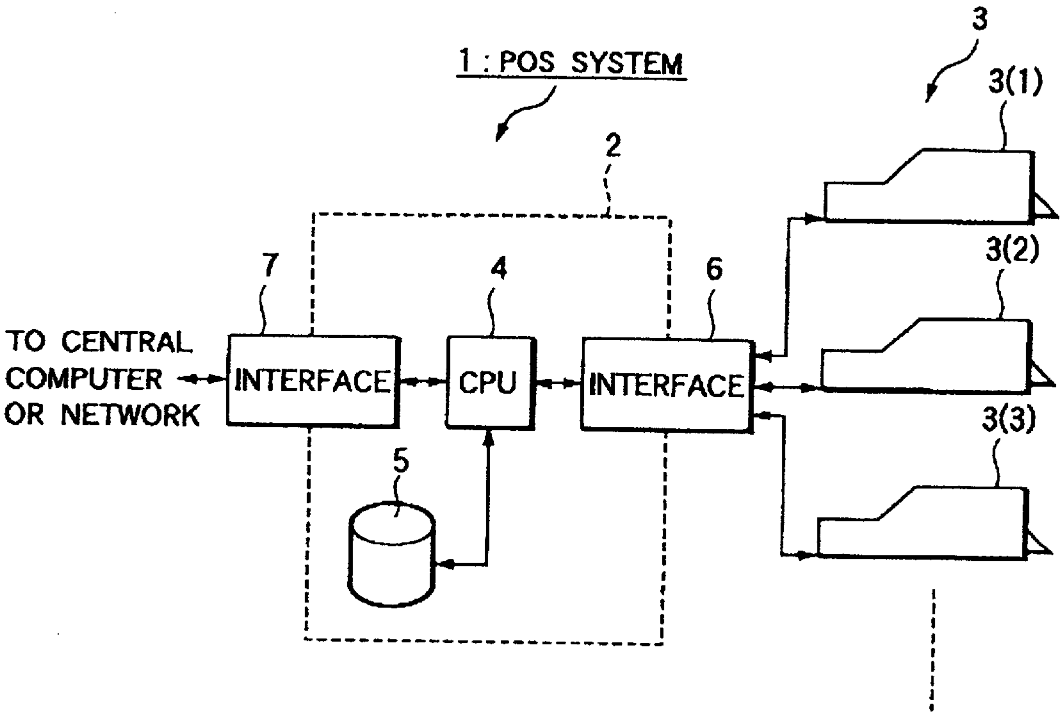
FIG. 1 is a schematic block diagram showing a POS system to which the present invention is applied.

FIG. 1 depicts a schematic block diagram showing a POS system to which the present invention has been applied. The POS system 1 according to a first embodiment is constituted of a store server 2 installed in a store, such as a convenience store, and a plurality of POS terminals 3 [3(1), 3(2), 3(3), . . . ] connected to the store server 2. A CPU 4 of the store server 2 comprises unillustrated memory, such as ROM, RAM, and disks, and is connected to a randomly-accessible storage device 5 having a comparatively large storage capacity, such as a disk drive unit.

The CPU 4 may be further connected to each terminal 3 via a POS terminal interface 6 and connected to an unillustrated central computer or network computer via a host interface 7. The central computer or network computer may be used to supply to the POS system 1 updated data pertaining to commercial products or like data.

Figure 2A:
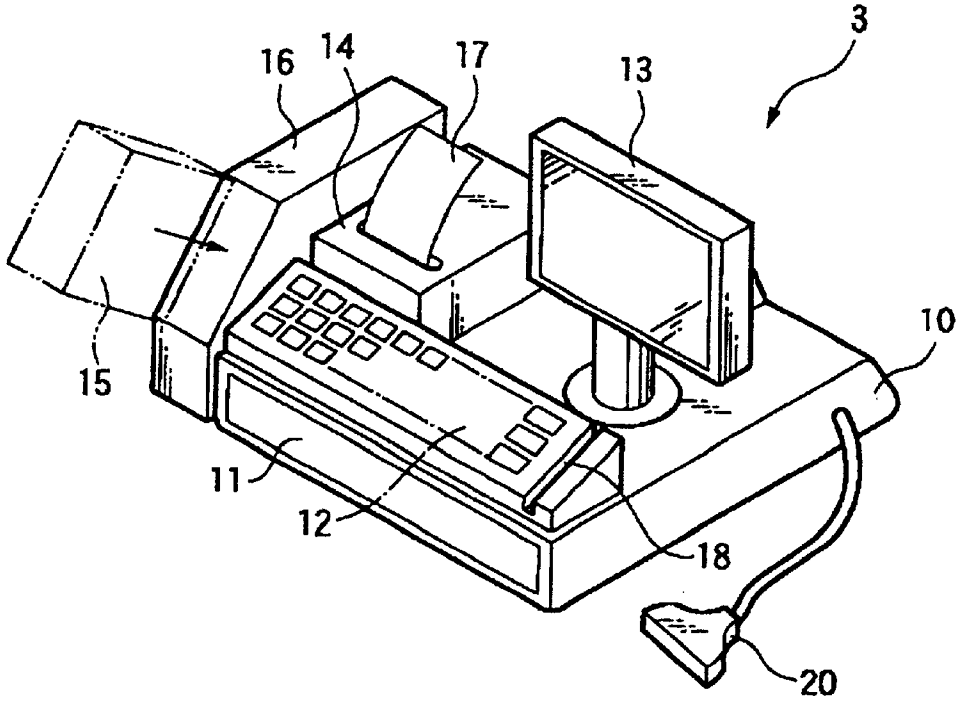
FIG. 2(*a*) is a front perspective view showing a POS terminal shown in FIG. 1.
Figure 2B:
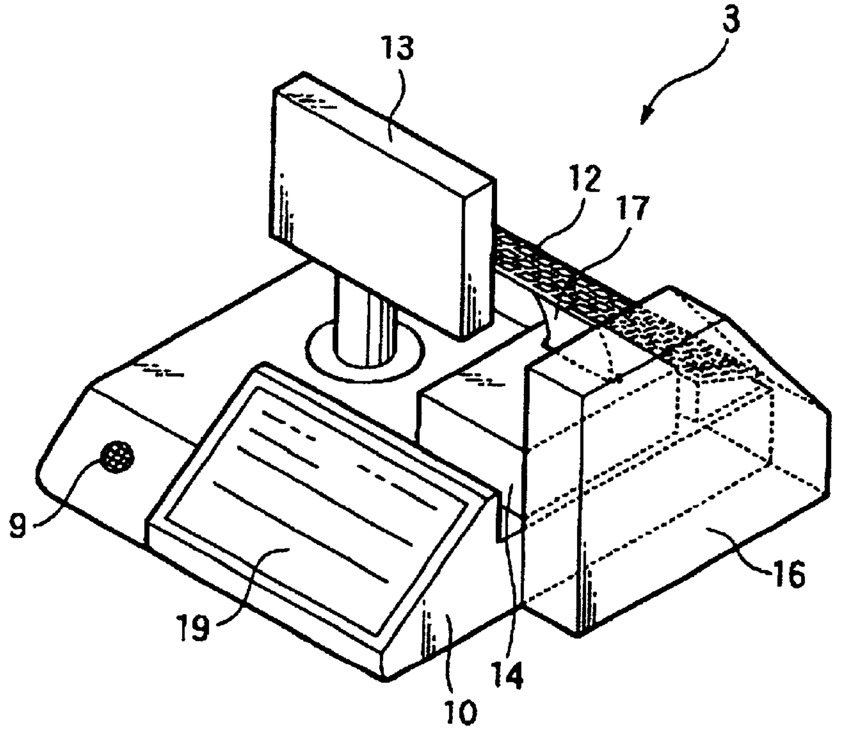

FIG. 2*a* is a perspective front view of one POS terminal 3 when viewed from a position from which an operator is to operate the POS terminal 3. FIG. 2*b* is a perspective rear view of the POS terminal 3 when viewed from the position of a customer. The POS terminal 3 may have a flat, rectangular-parallelepiped main unit case 10, and a cash drawer 11 accommodated therein. Provided on the front upper surface of the main unit case 10 may be an operator keyboard 12 by way of which an operator enters information about commodity products and customers. An operator indicator 13 and a printer 14 for issuing receipts may be provided side by side behind the keyboard 12. The POS terminal 3 may further be provided with a bar code reader 20, which is a symbol reader for reading linear bar code symbols affixed to or printed on commodity products.

The printer 14 employed in the present embodiment may be, for example, an ink-jet printer equipped with an ink-jet head and uses, as an ink supply source, an ink cartridge 15, which is a consumable item. A cartridge loading section 16 may be disposed at the side of the printer 14, and the ink cartridge 15 may be removably loaded to the ink cartridge 15. After cash registration processing has been performed, the printer 14 issues a receipt 17. Ad information may be printed in the margin. of course, one of ordinary skill in the art would recognize that the information may be printed in any number of locations, such as on a back side of the receipt 17. A card reader slot 18 may also be disposed alongside the operator keyboard 12 for reading a magnetic card such as a credit card. An indicator 19 for the customer (hereinafter called a "customer indicator") and a speaker 9 may also be provided on the back of the POS terminal 3.

Figure 3:
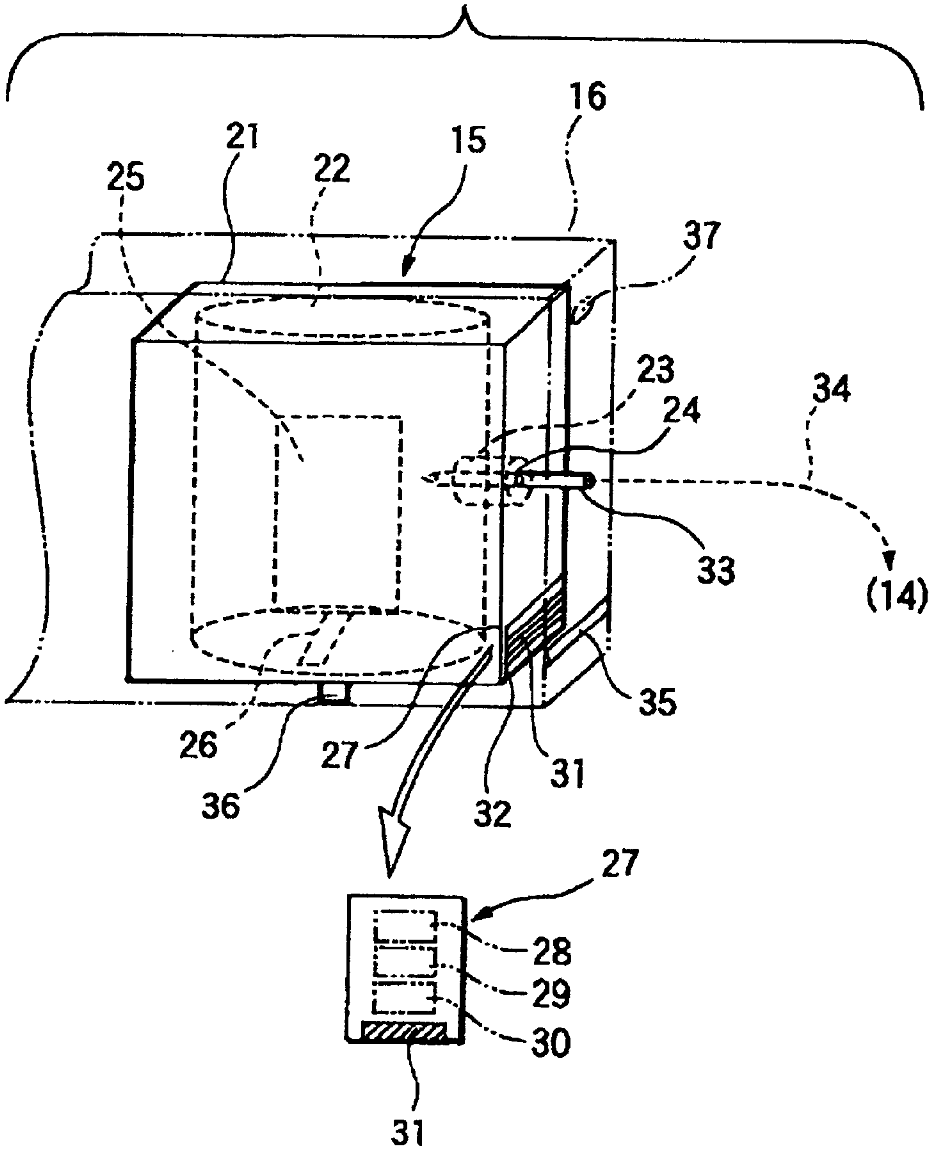
FIG. 3 is a descriptive view showing an ink cartridge to be used in the POS terminal shown in FIGS. 2A and 2B and a cartridge loading section.

FIG. 3 is a descriptive view showing the principal section of the cartridge loading section 16 and that of the ink cartridge 15 capable of being loaded thereto. The ink cartridge 15 may have a rectangular-parallelepiped case 21 and an ink bag 22 provided therein. A cylindrical ink output port 23 may be attached to the ink bag 22. The end face of the extremity of the ink output port 23 opposes an ink supply needle insert hole 24 formed in the front end face of the ink bag 22. A sensing plate 25 may be attached to the side surface of the ink bag 22 for detecting depletion of ink stored in the ink bag 22 upon detection of presence of a detection piece 26 formed at one end of the sensing plate 25, the sensing plate 25 is operable to detect depletion of ink (i.e., an ink end state).

The ink cartridge 15, according to the present invention, may have a built-in IC memory chip 27, and ad information may be stored in the front end portion of a case of the memory chip 27. Formed in the IC memory chip 27 may be at least a storage area 28 for storing ad information (information about commercial characters or images), a storage area 29 for storing information about the period of advertisement, and a storage area 30 for storing information about the history of depletion of ink stored in the ink cartridge 15. An information read/write terminal section 31 formed on the IC memory chip 27 may be exposed through an opening 32 formed in the case 21. Of course, one of ordinary skill in the art will recognize the wireless possibilities for transfer of the information from the IC memory chip 27 to an output device.

An ink supply needle 33 is provided in the cartridge loading section 16 into which the ink cartridge 15 of the foregoing construction is to be loaded. When the ink cartridge 15 is loaded into the ink cartridge loading section 16, the ink supply needle 33 is inserted into the ink output port 23. Thus, there is constituted an ink supply system 34 for supplying ink towards the ink-jet head of the printer 14 from the ink cartridge 15. The cartridge loading section 15 may be provided with an information read/write connector 35 to be connected to the terminal section 31 of the IC memory chip 27 of the thus-loaded ink cartridge 15. The information read/write connector 35 may be constituted of an ad information reading section 61, which is a memory reader to be described later; a write section 68; and an erasing section 67. There may also be provided a sensing section 36 for sensing an ink-end status of the ink cartridge 15 on the basis of the position of the detection piece 26 of the sensing plate 25, and a sensor 37 for sensing whether or not an ink cartridge is loaded.

Figure 4:
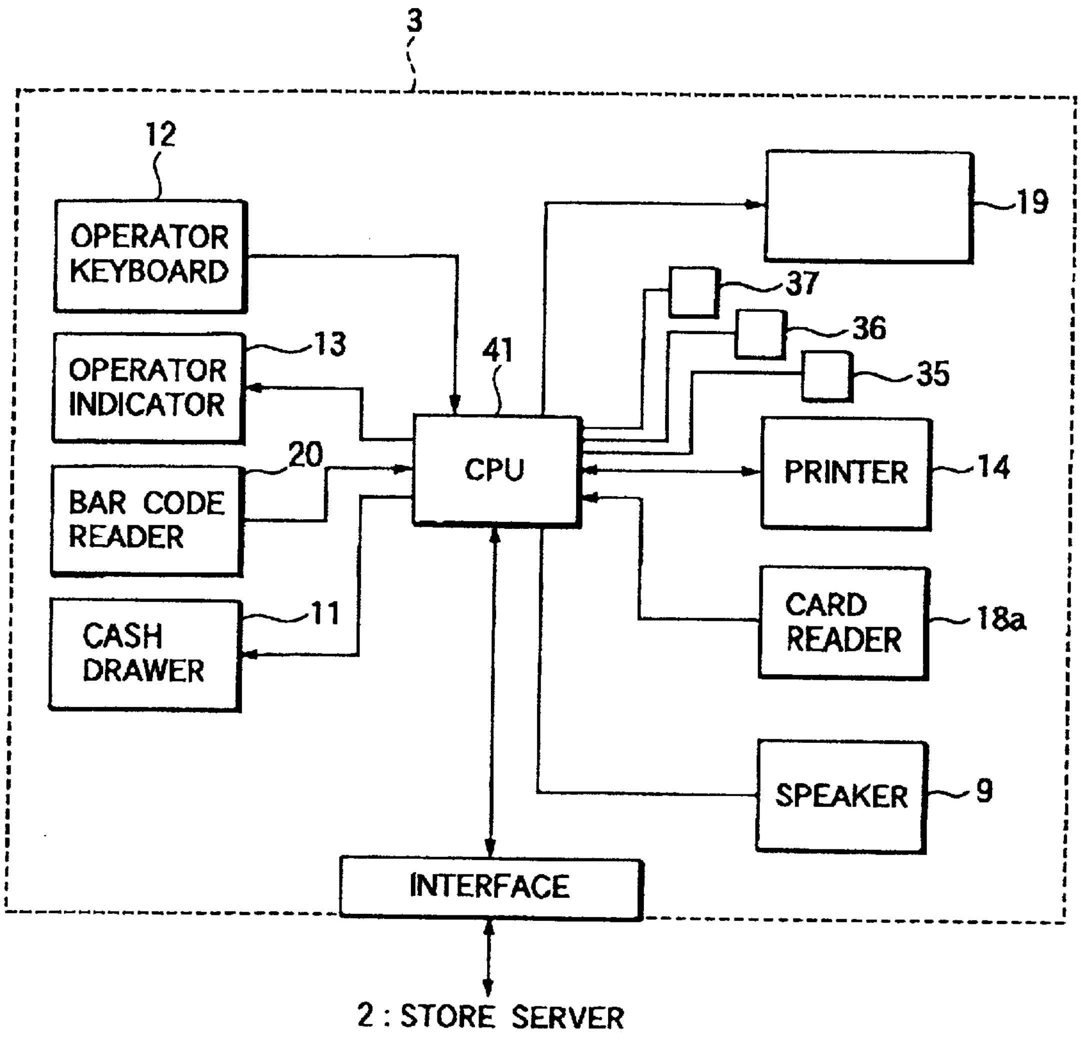
FIG. 4 is a schematic block diagram showing a control system of the POS terminal shown in FIG. 2.

FIG. 4 is a schematic block diagram showing a control system of the POS terminal 3 of the foregoing construction. The control system of the POS terminal 3 may be centered on a CPU 41. Although not illustrated, memory such as ROM or RAM or a storage device such as a disk may be contained in the CPU 41. Further, the CPU 41 may be connected to the operator keyboard 12, the operator indicator 13, the customer indicator 19, the bar code reader 20, the cash drawer 11, the printer 14, a card reader 18*a,* and the speaker 9. The CPU 41 may further be connected to the sensing section 36 for detecting an ink-end status, the information read/write connector 35, and the sensor 37. The CPU 41 controls the thus-connected sections, by means of activating an operating system or other software stored in internal memory.

Figure 5:
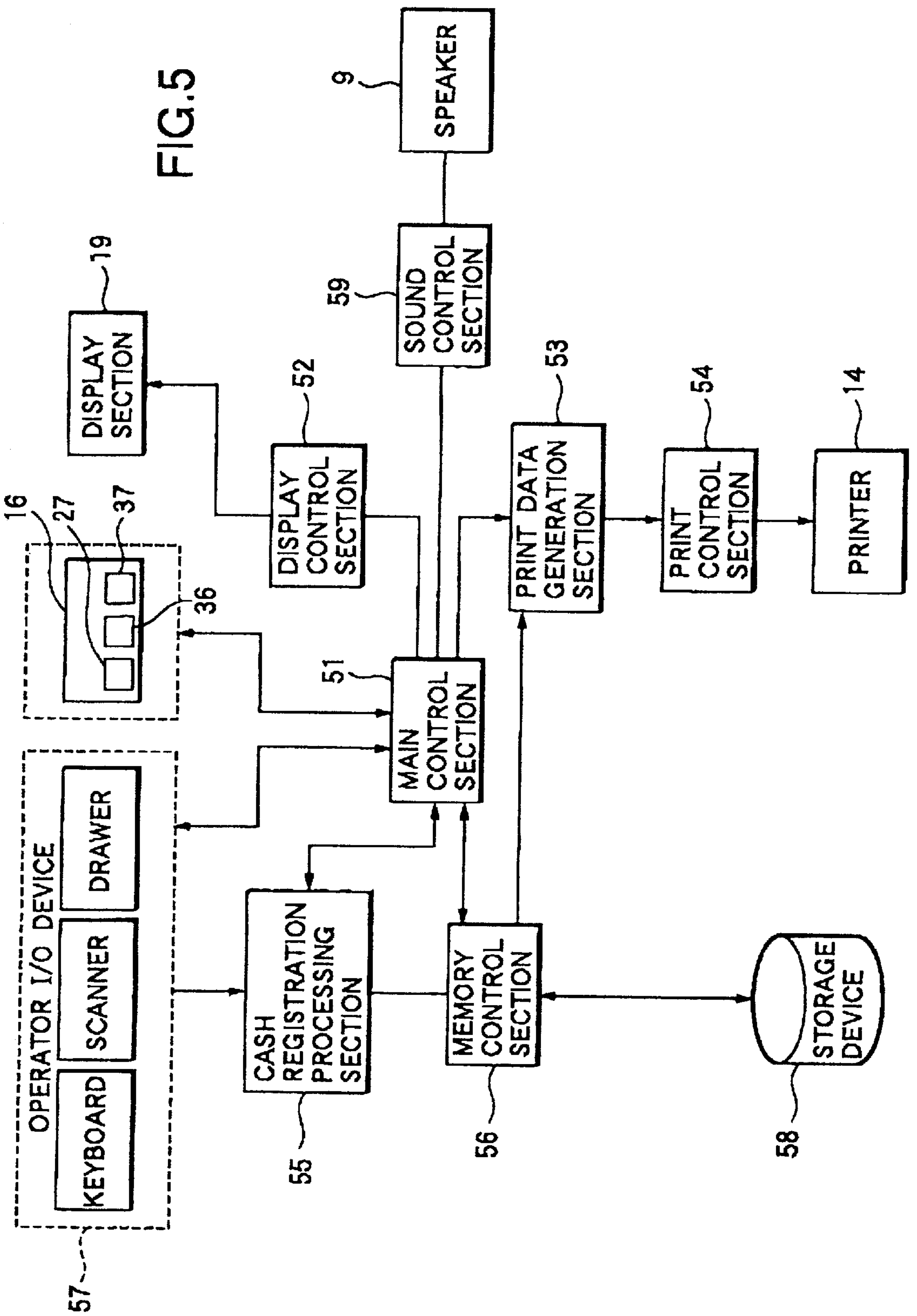
FIG. 5 is a functional block diagram showing the basic functions of the POS terminal shown in FIG. 2.

FIG. 5 is a functional block diagram showing the basic functions of the POS system 1, whose operations center on the CPU 41. As illustrated, the POS system 1 may have a main control section 51 for activating and controlling the overall POS system 1. The main control section 51 may be connected to a display control section 52, a sound control section 59, a print data generation section 53, a print control section 54, a cash registration processing section 55, a memory control section 56, and an operator I/O device 57. The memory control section 56 controls an external storage device 58.

The cash registration processing section 55 is a feature unique to a cash register such as a POS system and sequentially registers purchased merchandise as commodity products. Registration of a commodity product corresponds to a round of operations. That is, an operation for reading a linear bar code symbol or a like symbol attached to a commodity product, an operation for reading the price of a corresponding commodity product from the storage device 58, an operation for storing, as a purchase record, the name and price of a purchased commodity product and the number of commodity products purchased, and an operation for subtracting the number of purchased commodity products from inventory data.

Figure 6:
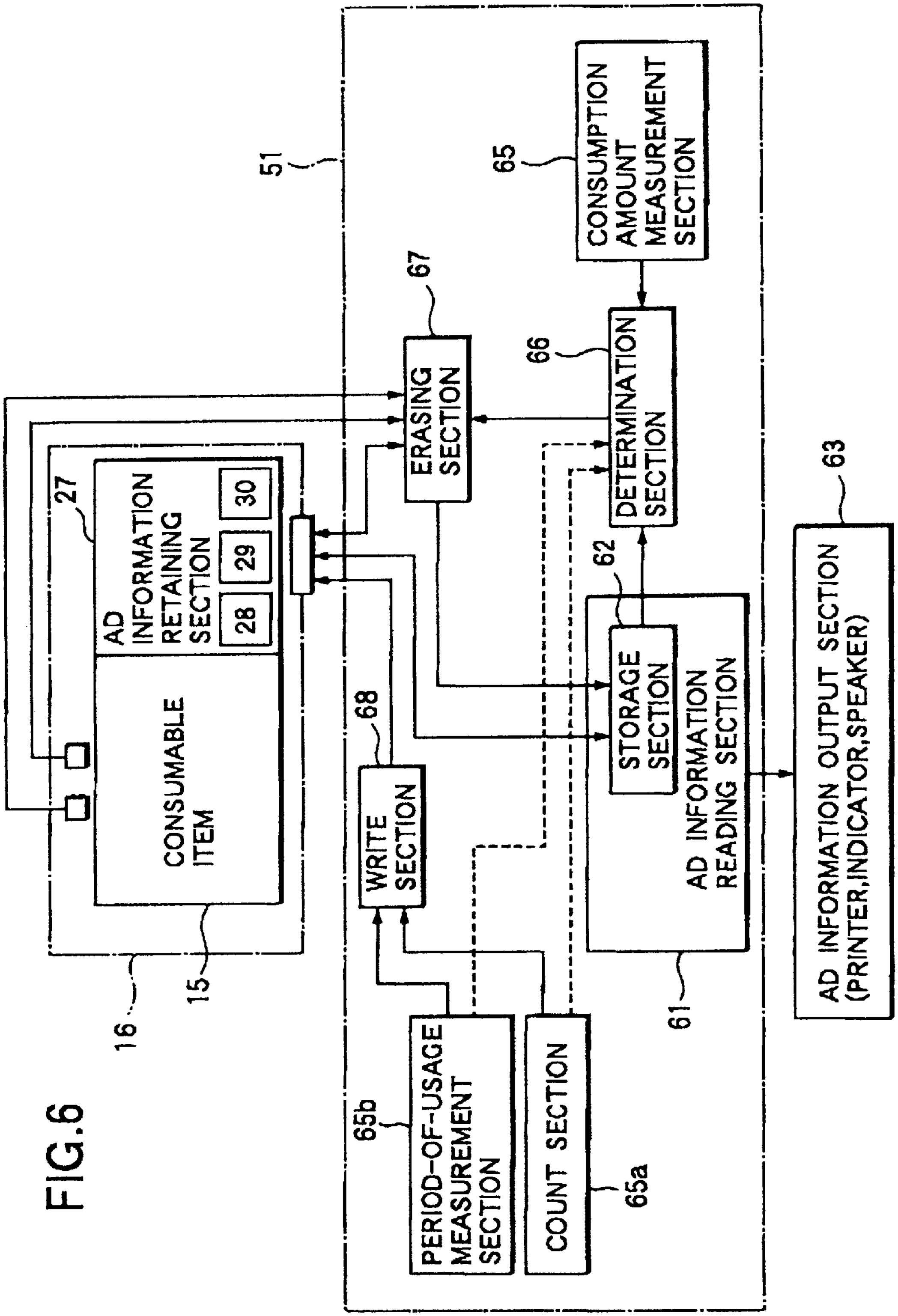
FIG. 6 is a schematic functional block diagram showing functions of a main control section of the POS terminal shown in FIG. 5.

The main control section 51 according to the present invention may have a control function which is shown in FIG. 6 in the form of a functional block. The main control section 51 may have an ad information reading section 61 for reading ad information stored in an IC memory chip 27 (an ad information retaining section) attached on the ink cartridge 15 (corresponding to a consumable product). The thus-read ad information may be retained by an ad information storage section 62. The ad information held in the ad information storage section 62 may be printed on the receipt 17 to be issued, by means of an ad information output section 63, such as a printer. Alternatively, the ad information may be displayed in the form of an image on the customer indicator 19, or output as ad information sound from the speaker 9. of course, one of ordinary skill in the art will recognize that the ad information may also be transmitted, by for example, network communication to other display, wireless, or remote devices.

In the present invention, information about the period of advertisement may be retained in the ad information storage section 62. When the depletion amount of a consumable item, for example, the quantity of used ink measured by a consumption amount measurement section 65, has reached the quantity of ink used which is stored in and retained by the storage section 62, a determination section 66 sends to the erasing section 67 a report to this effect. The erasing section 67 may then erase the ad information from the ad information storage section 62 and erase the ad information stored in the storage area 28 of the IC memory chip 27.

In relation to the POS system 1 according to the first embodiment having the foregoing construction, the user who uses the POS system 1 can arrange for a commercial sponsor to bear a portion of the purchase price of the ink cartridge 15 (a consumable product). More specifically, a commercial sponsor may effect, in advance, a contract with a company which offers the ink cartridge 15, thereby determining ad information to be stored in the IC memory chip 27 of the ink cartridge 15, a charge for the advertisement, and the period of advertisement. In connection with a store having the POS system 1 installed therein, the purchase price of the ink cartridge 15 (a commercial product) may accordingly be diminished by the amount corresponding to the charges for advertisement.

Figure 7:
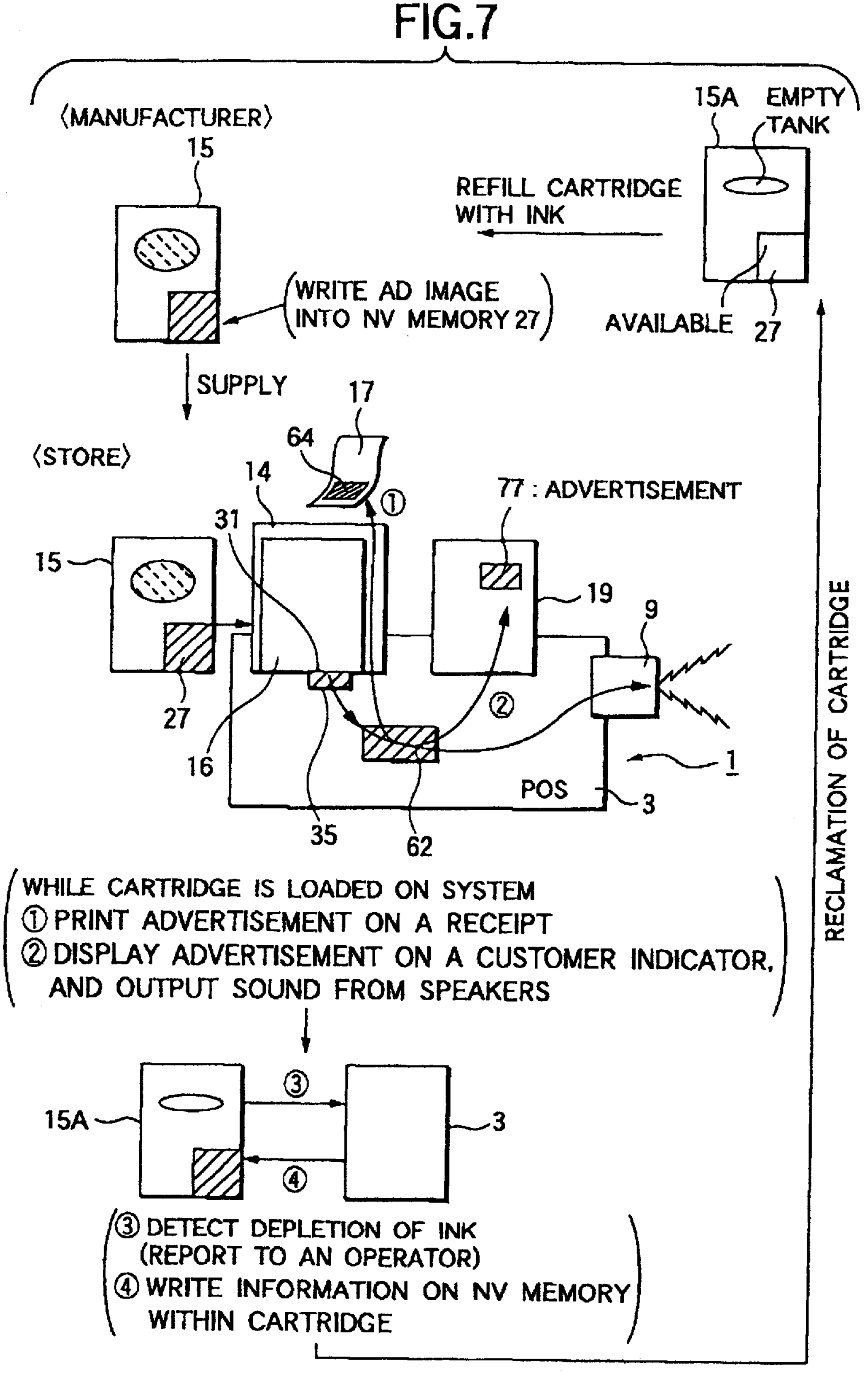
FIG. 7 is a descriptive view for describing the operation of the POS system shown in FIG. 1.

FIG. 7 is a descriptive view showing procedures through which the ad information stored in the ink cartridge 15 may be printed on a receipt in each POS terminal 3 of the POS system 1. The procedures are described by reference to the descriptive view. The user of the POS system 1 may purchase the ink cartridge 15 having the ad information stored therein. The ink cartridge 15 is then loaded to the cartridge loading section 16 of the respective POS terminal 3. When the ink cartridge 15 is loaded, the information read/write terminal section 31 is brought into connection with the information read/write connector 35 of the cartridge loading section 16. The POS terminal 3 reads the ad information and the information about the period of advertisement stored in the IC memory chip 27, and the thus-read information items are retained by the ad information storage section 62. At the time of issue of a receipt, ad information 64 is printed in the margin of the receipt 17 along with account information.

Figure 8A:
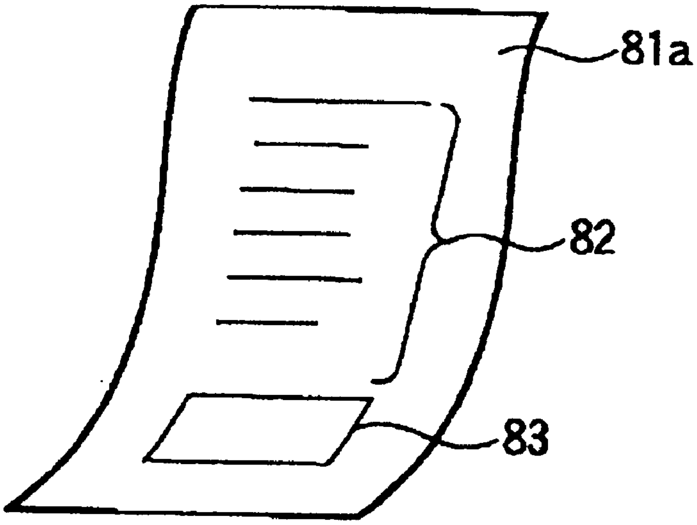
FIGS. 8(*a*) and 8(*b*) are descriptive views showing a position where an advertisement is printed on a receipt.
Figure 8B:
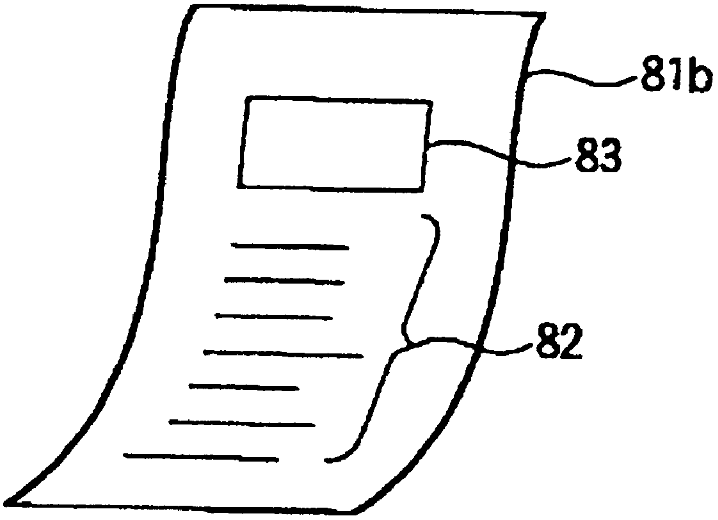

FIGS. 8(*a*) and 8(*b*) show example receipts, each having an advertisement printed thereon. As illustrated, each of receipts 81*a* and 81*b* to be issued may have a surface which includes a region 82 in which is printed account information (information about purchased commodity products, prices of the products, total price, amount tendered, change, date, the name of the store, etc.), and an advertisement region 83 having an advertisement printed therein. A leading-end margin of the receipt 81 can be used as the advertisement region 83 (i.e., the receipt 81*b*). Alternatively, a trailing-end margin of the receipt 81, or other areas of the receipt can be also used as the advertisement region 83 (i.e., the receipt 81*a*).

In order to shorten the time required for issuing a receipt slip, the printer 14, according to the present embodiment, may issue the receipt 81 which uses a leading-end margin of the receipt as the advertisement region 83 (i.e., the receipt 81*b*).

Figures 9A, 9B, 9C:
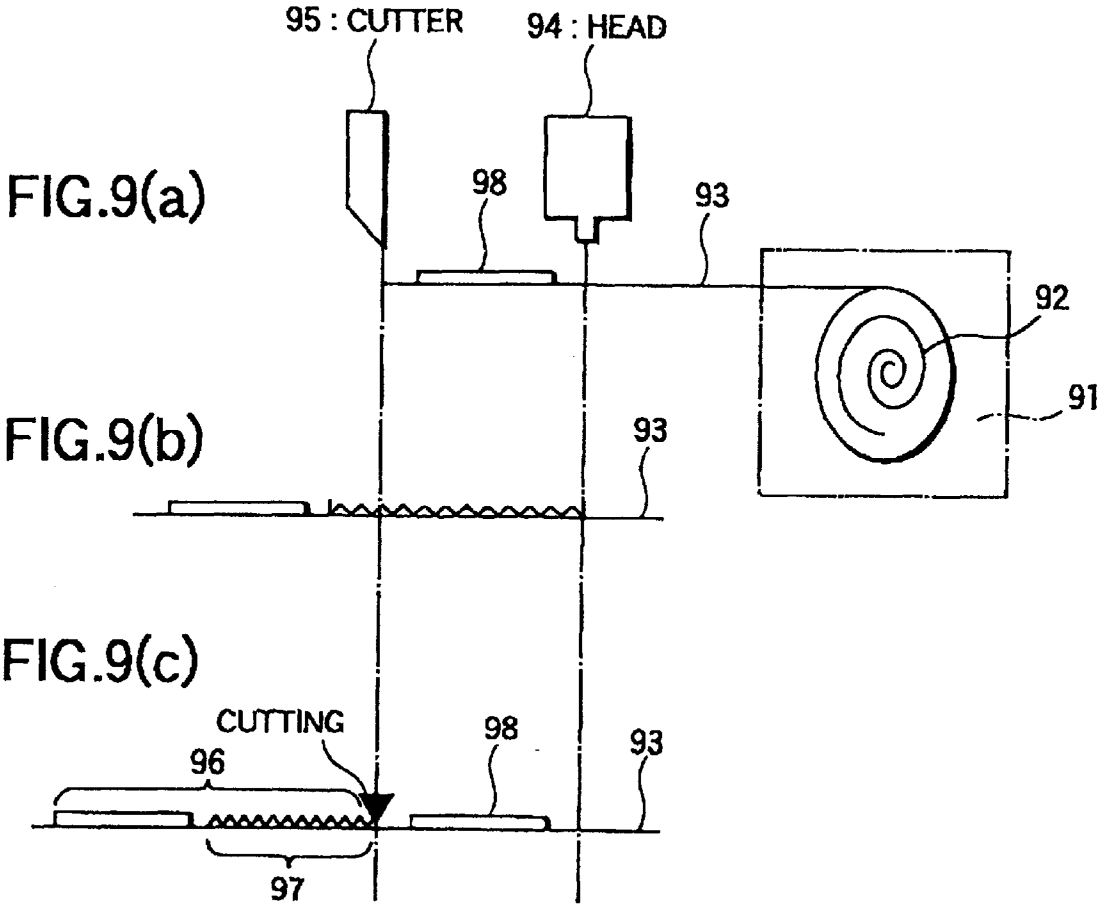
FIGS. 9(*a*) through 9(*c*) are descriptive views showing the operation of the POS system shown in FIG. 1 for printing an advertisement on a receipt.

As shown in FIGS. 9(*a*) through 9(*c*), tape-like recording paper 93 unreeled from a rolled paper 92 loaded in a recording paper roll loading section 91 of the printer 14 according to the present invention may be output to the outside via a cutting position for an automatic cutter 95 after having passed by a print position for an ink-jet head 94. In the present invention, at the time of issuance of a receipt slip 96, account information 97 to be printed may be printed on the receipt 96 (see FIG. 9(*b*)) Subsequently, ad information 98 may be printed in a leading end margin of the next receipt to be printed (see FIG. 9(*c*)). In a point in time subsequent to printing of the ad information 98, the trailing edge of the receipt 96 to be issued may be situated at the cutting position for the automatic cutter 95, where the recording paper is to be cut, whereby a receipt slip 96 may be issued. By the time of issuance of the next receipt, the ad information has already been printed in the leading margin of the receipt (see FIG. 9(*a*)). Hence, the receipt can be issued, so long as account information is printed on the receipt. Under the print drive method according to the present invention, one receipt slip is issued within the same period of time as that required when no ad information is printed on a receipt. Accordingly, a receipt having advertisement printed thereon can be issued within a short period of time.

Turning again to FIG. 6, in the first embodiment information about a period of advertisement may also be retained in the IC memory chip 27. Here, information about the period of advertisement corresponds to, for example, the amount of ink consumed. The main control section 51 may be equipped with the consumption amount measurement section 65 for measuring the quantity of ink consumed. If the actual quantity of ink consumed has reached the quantity of ink consumed retained in the ad information storage section 62, the main control section 51 finishes printing the advertisement. More specifically, the ad information retained in the ad information storage section 62 may be erased, and an operation for issuing the receipt 71 while advertisement is printed thereon may be stopped, and the receipt 71 issued by means of printing only account information.

Information about the period of advertisement can be embodied as the number of receipts issued in lieu of the quantity of ink consumed. In this case, the main control section 51 may be equipped with a count section 65a for counting the number of receipts issued. When the number of receipts issued after loading of an ink cartridge has reached the number of receipts issued retained in the ad information storage section 62, printing of advertisement on a receipt may be stopped. The period of advertisement may be determined on the basis of the period of use of the ink cartridge 15 since loading of the ink cartridge 15, rather than on the basis of the number of receipts issued. As indicated by dotted lines shown in FIG. 6, the period of use of an ink cartridge is counted by use of a period-of-usage measurement section 65*b*. Thus, so long as information about the period of advertisement is retained in the ink cartridge 15, the commercial sponsor enables issuance of advertisement with a greater variety of price schedules.

As a matter of course, it may be the case that no information about the period of advertisement is retained in the ink cartridge 15. In this case, an advertisement may be issued over a period of time during which the ink cartridge 15 remains loaded in the cartridge loading section 16. More specifically, the information retained in the ad information storage section 62 may be erased on the basis of a signal output from a cartridge presence/absence sensor 37. As an alternative, issuance of advertisement may be stopped after an ink end status has been detected on the basis of a signal output from the sensing section 36.

The IC memory chip 27 of the ink cartridge 15 according to the present invention may be equipped with an area 30 for storing ad information history information about an amount of advertisement output by the ad information output section. The main control section 51 of the POS terminal 3 may be provided with the period-of-usage measurement section 65*b* and the count section 65*a*. After the ink cartridge 15 has been loaded, the period of time during which the ink cartridge 15 remains loaded may be measured, and the number of receipts issued measured. The thus-measured values may then be delivered to the write section 68, and the write section 68 may write the values into the IC memory chip 27 of the ink cartridge 15 as advertisement history information. The writing operation may be performed at a point in time at which depletion of the ink cartridge 15 has been detected, at the end of period of advertisement, or every time a receipt is issued.

In this case, measured values are desirably written in a state in which the ink cartridge 15 may be removed after the period-of-usage measurement section 65*b* and the count section 65*a* have performed measurement operations; for example, when the cover of the cartridge loading section 16 has been removed. Such a configuration yields the advantage of the ability to enable continued use of the ink cartridge on the basis of the written advertisement history information even when the ink cartridge 15 has been unloaded from the cartridge loading section 16 while still remaining in an available state.

Turning back to FIG. 7, an ink cartridge provider who has reclaimed a used ink cartridge 15A having the advertisement history information written therein can submit the state of advertisement issuance to a commercial sponsor on the basis of the information. Accordingly, if such a configuration is adopted, there can be established a system in which a commercial sponsor pays charges for advertisement corresponding to an extent to which advertisement has been issued (for example, the number of receipts issued) after reclamation of an ink cartridge. If information about the name of a store which has used an ink cartridge is included in the advertisement history information, the retail price of an ink cartridge for each store can be determined in accordance with, for example, the extent to which advertisement has been issued (for example, the number of receipts issued), in such a way that an ink cartridge is provided at a lower price to a store which issues a large amount of advertisement.

When the used ink cartridge 15 is refilled for recycling, advertisement is to be printed on receipts again. In order to prevent issuance of advertisement in excess of the contracted period of time (that is, the period of advertisements, the POS terminal 3 may erase the ad information storage area 28 in the IC memory chip 27 of the ink cartridge 15 after lapse of the period of advertisement or after an ink end status has been detected. As a matter of course, in the present embodiment, information about the period of advertisement may be stored and retained in the ink cartridge 15, thereby preventing issuance of advertisement in excess of the period of advertisement. In a case where the ink cartridge 15 does not store information about the period of advertisement, erasure of advertisement information from the ink cartridge 15 is effective.

In the first embodiment of the present invention, the POS system 1 may print on a receipt an advertisement held by the ink cartridge 15. In lieu of this, advertisement information 77 may be displayed in the form of an image on the customer indicator 19 at all times or every time a receipt is issued. Alternatively, advertisement information may be displayed on the customer indicator 19 as well as printed on a receipt.

In a case where an advertisement is displayed on the customer indicator 19, the period of advertisement can be taken as the cumulative sum of periods during which an advertisement has been displayed on the indicator. Similarly, even in the case of the advertisement history information, the period of advertisement can be taken as the cumulative amount of time during which an advertisement has been issued.

In this second embodiment of the POS system 1, the case of the ink cartridge 15 may be provided with the IC memory chip 27, and ad information may be stored in the case. The method of retaining ad information may also be embodied as, for example, a linear bar code symbol printed on the case of the ink cartridge 15 or on the surface of a packaging material, rather than as a storage medium. In this case, use of a two-dimensional symbol capable of retaining a large volume of information is often desirable.

In a case where ad information is retained by a symbol, for example, a linear bar code symbol or two-dimensional symbol, each POS terminal 3 may be equipped beforehand with a bar code reader, which is a symbol reader for reading symbols, or with a scanner, which is also a symbol reader. Before the ink cartridge 15 is loaded on the cartridge loading section 16, a symbol printed on the ink cartridge 15 may be read. The symbol information is then decoded, and the thus-decoded symbol information may be retained in the ad information storage section 62. The ad information may be printed on a receipt or displayed on the indicator.

Figure 10A:
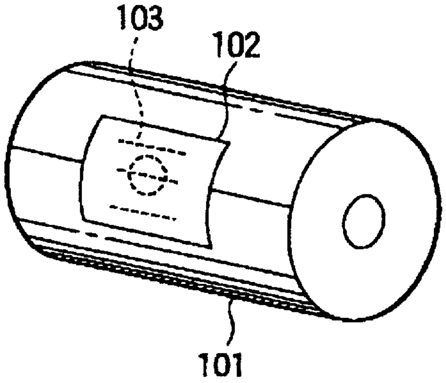
FIGS. 10(*a*) through 10(*c*) are descriptive views showing an example of POS system constructed so as to print ad information retained by a rolled paper.
Figure 10B:
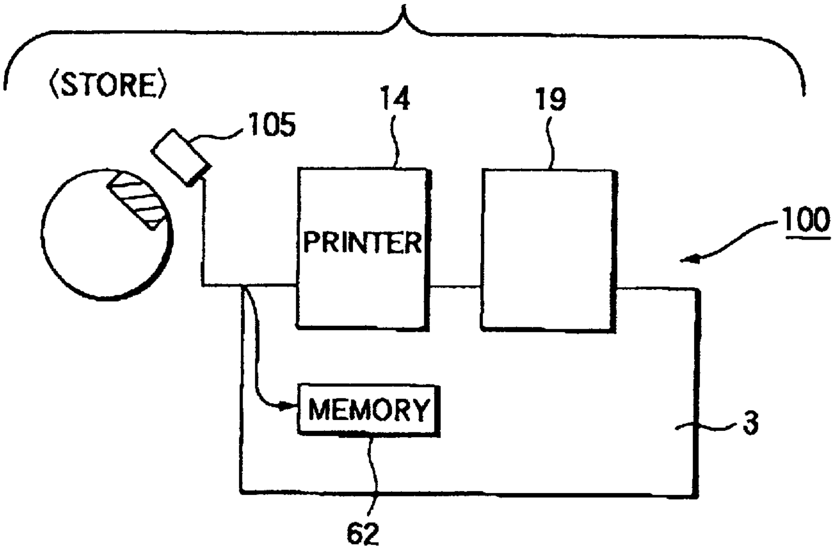
Figure 10C:
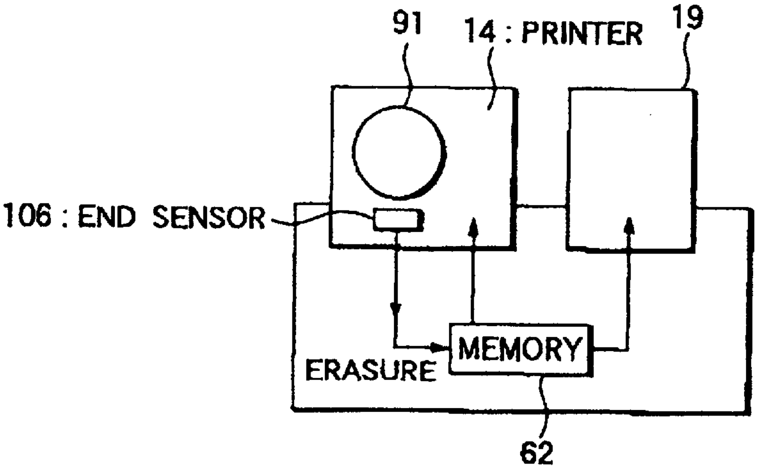

In a third embodiment of the POS system 1, the ink cartridge 15 used with the printer 14 retains ad information and another consumable item of the POS system 1 used may be a rolled paper. FIGS. 10(*a*) through 10(*c*) show the operation of a POS system when ad information is retained on a rolled paper.

Even in this case, a POS system 100 is identical in basic operation with the POS system 1 described in connection with the previous embodiments. Hence, the same reference numerals are assigned to corresponding elements, and their explanations are omitted. As shown in FIG. 10(*a*), a two-dimensional symbol 103 may be printed on the surface of a seal tap 102 serving as a packaging material for a rolled paper 101 used in the POS system 100 of the present embodiment. The ad information retained in the two-dimensional symbol 103 may be retained by means of a contract effected between a provider of a rolled paper and a commercial sponsor.

Before the rolled paper 101 having the foregoing construction is loaded to a roll loading section 91, a two-dimensional symbol 103 printed on the seal tape 102 may be read by a symbol scanner 105, which is a dedicated symbol reader. The thus-read symbol information is then decoded, and the thus-decoded ad information may be retained in an ad information storage section 62.

Subsequently, ad information may be printed on a receipt to be issued. Alternatively, ad information may be displayed on the customer indicator 19.

In order to detect depletion of a rolled paper, when an end sensor 106 provided in the roll loading section 91 has detected depletion of a rolled paper, the information stored in the ad information storage section 62 may be erased, thus terminating issuance of an advertisement (FIG. 10(*c*)).

When information about the period of advertisement is retained in the form of a two-dimensional symbol, issuance of an advertisement may be terminated only after completion of the period of advertisement. For instance, the period of advertisement can be determined on the basis of the number of receipts issued or on the basis of the length of a roll of paper employed. In a case where an advertisement is displayed on the customer indicator 19, the period of advertisement can be specified as an advertisement display time.

The previous embodiments of the present invention have described a case where the present invention has been applied to the POS system. As a matter of course, the present invention can be applied, in the same manner, to another system for issuing receipts and the like. For example, this invention could be applied to the stand alone type receipt or the like issuing machine.

In a fourth embodiment, the POS system 1, a display device, such as the customer indicator 19, and a sound output section, such as the speaker 9, may be integrally incorporated into the POS terminal 3. However, a display device and a sound output section may be disposed separately in positions remote from the POS terminal 3. Thus, a display device and a sound output section can be disposed in positions where a good advertisement effect is yielded.

In this case, if a display device specifically designed for advertisement purposes is disposed in the vicinity of the entrance of a store, an advertisement can be delivered to a greater number of customers. Alternatively, output from a sound output section may be periodically broadcast by way of speakers disposed in a store, thereby greatly improving an effect of advertisement. For this reason, if the advertisement history information includes this kind of external terminal, the range or number of customers to which ad information is to be delivered, information as to whether or not commodity products relevant to ad information are sold, the number of times an advertisement is issued, the effect of advertisement, and the amount of cash paid back to the user can be increased further.

For example, if an advertisement pertains to a commodity product sold in a store, a great effect will be yielded. Hence, if output to external speakers is delivered to the entire floor of a store, a commercial sponsor can provide cash back in an amount corresponding to a total purchase price of the ink cartridge or cash back along with a charge for advertisement.

Embodiments of the present invention have described a case where an ink cartridge and a rolled paper are taken as consumable items. However, ad information may be provided on consumable items other than those mentioned above For example, in the case of a system for issuing receipts and the like which operates on battery power, ad information is retained on the surface of a battery by use of a linear bar code system or a two-dimensional symbol.

Moreover, an IC memory chip having a connection terminal is employed in the described embodiments, but the same advantage will be yielded by a reader or writer corresponding to the memory chip even if the reader or writer is made of a non-contact IC.

The embodiments of the present invention have also described a POS terminal equipped with a printer, a display device, and a sound output section. However, a POS system may have only one of these features, and no particular limitations are imposed on the kind of output device or the number of output devices. Further, this embodiments of the present invention are equipped with the ink jet printer. Of course, the present invention could employ a thermal printer which consumes the recording medium only.

As has been described, in a system for issuing receipts and advertising according to the present invention, ad information is retained in an ink cartridge or a rolled paper, which is a consumable item of an apparatus for printing receipts and the like constituting the system. The ad information is output and printed on receipts to be issued from the apparatus or output or displayed on a display device as an image.

So long as a consumable item provider has effected a contract with a commercial sponsor beforehand with regard to an advertisement, consumable items can be provided to users while charges for an advertisement to be printed on receipts or displayed on an indicator of an apparatus for printing receipts and advertising are subtracted from the purchase price of the consumable items. Hence, consumable products can be provided at low costs, thereby enabling provision of a larger number of consumable items at lower costs. In contrast, consumable item users can purchase consumable items at lower costs, thus diminishing expenses to be borne by the users.

What is claimed is:

1. A system for issuing receipts and advertising including an apparatus for printing receipts and the like, the system comprising:

a consumable item including an ad information retaining section for retaining ad information;

a consumable item loading section for loading the consumable item to the printing apparatus;

an ad information reading section for reading the ad information retained in the ad information retaining section; and an ad information output section for outputting the read ad information.

2. The system for issuing receipts and advertising according to claim 1, wherein the consumable item is one of an ink cartridge and a rolled paper.

3. The system for issuing receipts and advertising according to claim 1, wherein the ad information retaining section retains information about a period of advertisement in which the ad information output section can output the ad information.

4. The system for issuing receipts and advertising according to claim 3, further comprising an amount-of-consumption measurement section for measuring a consumption amount of the consumable item loaded onto the consumable item loading section, and wherein the ad information output section is operable to stop outputting an advertisement when the consumption amount of the consumable item has reached a predetermined consumption amount read by the ad information reading section.

5. The system for issuing receipts and advertising according to claim 3, further comprising a time-of-use measurement section for measuring a period of time during which the consumable item loaded onto the consumable item loading section has been used, and wherein the ad information output section is operable to stop outputting an advertisement when the period of time during which the consumable item has been consumed has reached a predetermined period of consumption time read by the ad information reading section.

6. The system for issuing receipts and advertising according to claim 1, wherein the ad information retaining section includes a memory chip, and the ad reading section includes a memory reader for reading the ad information from the memory chip.

7. The system for issuing receipts and advertising according to claim 6, wherein the memory reader includes a read terminal for connecting a terminal of the memory chip when the consumable item is loaded to the consumable item loading section.

8. The system for issuing receipts and advertising according to claim 6, wherein the memory chip includes an ad history information storage area for storing ad history information about an amount of advertisement output by the ad information output section, the system further comprising: a write section for writing into the history information storage area the ad history information.

9. The system for issuing receipts and advertising according to claim 6, further comprising an end sensor for detecting depletion of the consumable item loaded to the consumable item loading section, and an ad information erasure section operable to erase information stored in the memory chip.

10. The system for issuing receipts and advertising according to claim 1, wherein the ad information retaining section corresponds to one of a linear bar code symbol and a two-dimensional symbol, and the ad information reading section includes a symbol reader for reading the symbol.

11. The system for issuing receipts and advertising according to claim 1, wherein the ad information output section includes a print section for printing ad information on receipts and the like issued from the apparatus.

12. The system for issuing receipts and advertising according to claim 11, wherein the consumable item is a rolled paper, and the print section prints the ad information in a leading area of the next receipt in a recording paper unreeled from the rolled paper.

13. The system for issuing receipts and advertising according to claim 1, wherein the ad information output section includes a display section for displaying the ad information on a screen as image information.

14. The system for issuing receipts and advertising according to claim 1, wherein the ad information output section includes a sound output section for outputting the ad information as sound.

15. The system for issuing receipts and advertising according to claim 1, wherein the ad information reading section includes an ad information storage section for storing the ad information read from the consumable item, and the ad information output section is operable to output ad information stored in the ad information storage section.

16. The system for issuing receipts and advertising according to claim 15, further comprising an end sensor for detecting depletion of the consumable item loaded onto the consumable item loading section, and an ad information erasure section operable to erase the ad information from the ad information storage section when the end sensor has detected depletion of the consumable item.

17. A receipt issuing apparatus for issuing receipts and advertising including:

a consumable item loading section for loading a consumable item including an ad information retaining section for retaining ad information;

an ad information reading section for reading the ad information retained in the ad information retaining section; and an ad information output section for outputting the read ad information.

18. A method of issuing receipts and advertising comprising the steps of:

storing information in a consumable item;

reading the information from the consumable item when the consumable item is placed in a consumable item loading section of an information apparatus; and outputting the read information from an information output section.

19. A method of issuing receipts and advertising, comprising the steps of:

retaining ad information in an ink cartridge;

reading the ad information from the ink cartridge by using an apparatus which issues receipts and the like and uses the ink cartridge as an ink supply source to print the ad information; and printing the read ad information on a receipt and the like issued from the apparatus.

20. The method of issuing receipts and advertising according to claim 19, further comprising the steps of;

displaying the read ad information in the form of an advertisement on a display section.

21. A method of issuing receipts and advertising, comprising the steps of:

retaining ad information on a rolled paper;

reading the ad information from the rolled paper using an apparatus which issues receipts and the like and uses the rolled paper as a recording medium supply source to print the information; and printing the read information on recording paper unreeled from the rolled paper, thereby recording the information on a receipt to be issued.

22. The method of issuing receipts and advertising according to claim 21, further comprising the steps of:

displaying the read information in the form of an advertisement on a display section.

23. A consumable item having ad information retained therein to be used for the system for issuing receipts and advertising according to claim 1.

24. A rolled paper to be used in a printer, the rolled paper provided with an ad information retaining section which retains coded ad information.

25. The rolled paper according to claim 24, wherein the coded ad information is readable by a reader for decoding the coded ad information.

26. The rolled paper according to claim 25, wherein the ad information retaining section corresponds to a two-dimensional symbol.

27. An ink cartridge storing ink to be used for an ink-jet printer, the ink cartridge provided with an ad information retaining section which retains coded ad information.

28. The ink cartridge according to claim 27, wherein the corded ad information is readable by a reader for decoding the coded ad information.

29. The ink cartridge according to claim 28, wherein the ad information retaining section corresponds to one of a two-dimensional symbol and a memory chip.

* * * * *